US006823773B2

(12) United States Patent
Swinford et al.

(10) Patent No.: US 6,823,773 B2
(45) Date of Patent: Nov. 30, 2004

(54) ROASTER WITH HANGING AND INTERLOCKING RACK

(75) Inventors: Karen J. Swinford, Schaumburg, IL (US); Jeffrey Bull, Naperville, IL (US); Denise Marie Simon, Harbor Springs, MI (US); Shawn Young, Aurora, IL (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

(21) Appl. No.: 10/749,173

(22) Filed: Dec. 30, 2003

(65) Prior Publication Data

US 2004/0149143 A1 Aug. 5, 2004

Related U.S. Application Data

(63) Continuation of application No. 10/231,763, filed on Aug. 28, 2002, now Pat. No. 6,668,708.

(51) Int. Cl.[7] .............................. A23L 1/00; A47J 37/00; A47J 37/04; A47J 43/00; A47J 43/18
(52) U.S. Cl. .............................. 99/426; 99/444; 99/449; 99/450
(58) Field of Search .......................... 99/339, 340, 426, 99/427, 444–450, 394; 211/181.1, 175, 49.1, 60.1; 248/166, 172, 175; 294/1.1, 15, 152, 164, 169; D7/409; 126/9 R, 25 R, 41 R; 426/523, 506; 220/912, 573.1, 743, 756, 315

(56) References Cited

U.S. PATENT DOCUMENTS

| 527,252 | A | * | 10/1894 | Stroud | 126/369 |
|---|---|---|---|---|---|
| 629,127 | A | * | 7/1899 | Geer | 99/402 |
| 823,071 | A | * | 6/1906 | Nelson | 220/212.5 |
| 1,271,326 | A | * | 7/1918 | Kivian | 99/449 |
| 2,504,237 | A | * | 4/1950 | Weissbach | 99/426 |
| 2,549,709 | A | * | 4/1951 | Potts | 99/449 |
| 2,703,046 | A | * | 3/1955 | Ahlquist | 99/449 |
| 3,359,889 | A | * | 12/1967 | Young et al. | 99/426 |
| 3,972,318 | A | * | 8/1976 | Lenoir | 126/348 |
| 4,186,217 | A |  | 1/1980 | Tchack |  |
| 4,200,040 | A | * | 4/1980 | MacRae | 99/426 |
| 4,291,616 | A | * | 9/1981 | Taylor | 99/446 |
| 4,717,038 | A | * | 1/1988 | Anders | 220/769 |
| 4,880,951 | A |  | 11/1989 | Levinson |  |
| 5,069,117 | A |  | 12/1991 | Schlessel |  |
| D333,235 | S |  | 2/1993 | Bertelsen |  |
| 5,511,467 | A |  | 4/1996 | Motley et al. |  |
| 5,562,023 | A |  | 10/1996 | Harrison |  |
| D387,949 | S |  | 12/1997 | Bentson |  |
| 5,826,494 | A |  | 10/1998 | Wang |  |
| 5,967,022 | A |  | 10/1999 | Moschella |  |
| D416,169 | S |  | 11/1999 | Sarnoff et al. |  |
| 5,983,786 | A |  | 11/1999 | Brown |  |
| 6,065,629 | A |  | 5/2000 | Sarnoff et al. |  |
| 6,131,506 | A |  | 10/2000 | Kemper |  |
| 6,213,005 | B1 |  | 4/2001 | Sherman et al. |  |
| 6,237,803 | B1 |  | 5/2001 | Sarnoff et al. |  |
| 6,668,708 | B1 | * | 12/2003 | Swinford et al. | 99/426 |

* cited by examiner

Primary Examiner—Timothy F. Simone
(74) Attorney, Agent, or Firm—Piper Rudnick LLP

(57) ABSTRACT

A rack of a cooking implement includes a surface for supporting food, opposed sides and opposed ends separated by the food supporting surface. The rack also includes opposing looped handles. A pan of a cooking implement has opposed end walls that are spaced apart at length further than the length of the rack and opposed side walls that are spaced apart at a width wider than the width of the rack. The pan also includes opposing upstanding handles. The handles include at least one horizontal resting surface for supporting the looped handle of the rack and at least one vertical retaining surface for abutting the looped handle of the rack. As a result, the looped handles of the rack are received and supported by the handles of the pan thereby permitting the rack to hang within the interior of the pan.

20 Claims, 6 Drawing Sheets

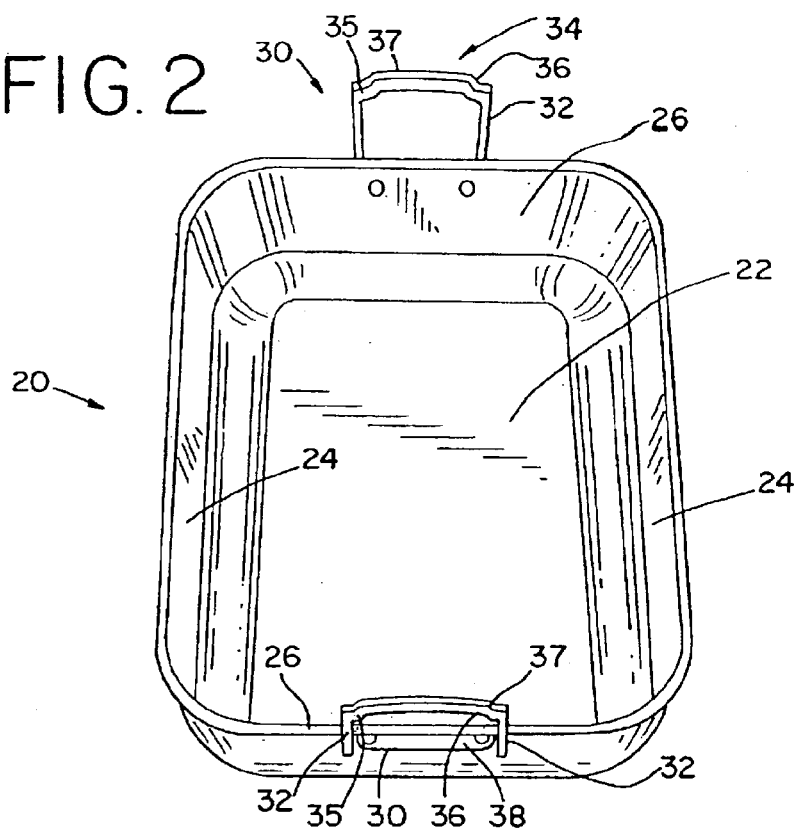
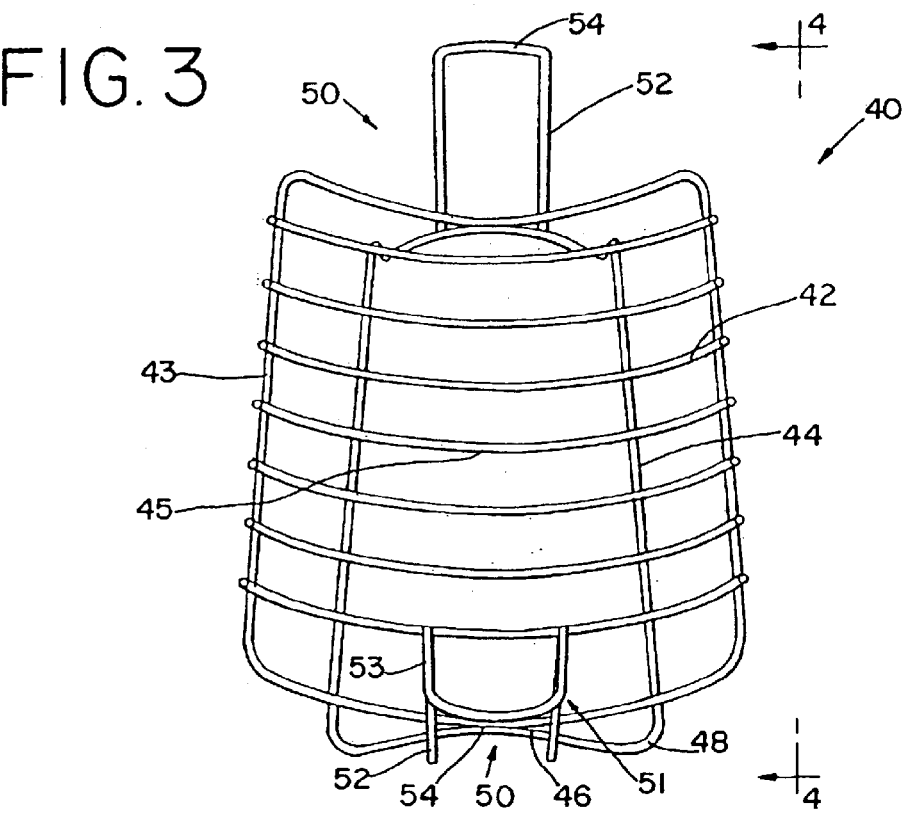

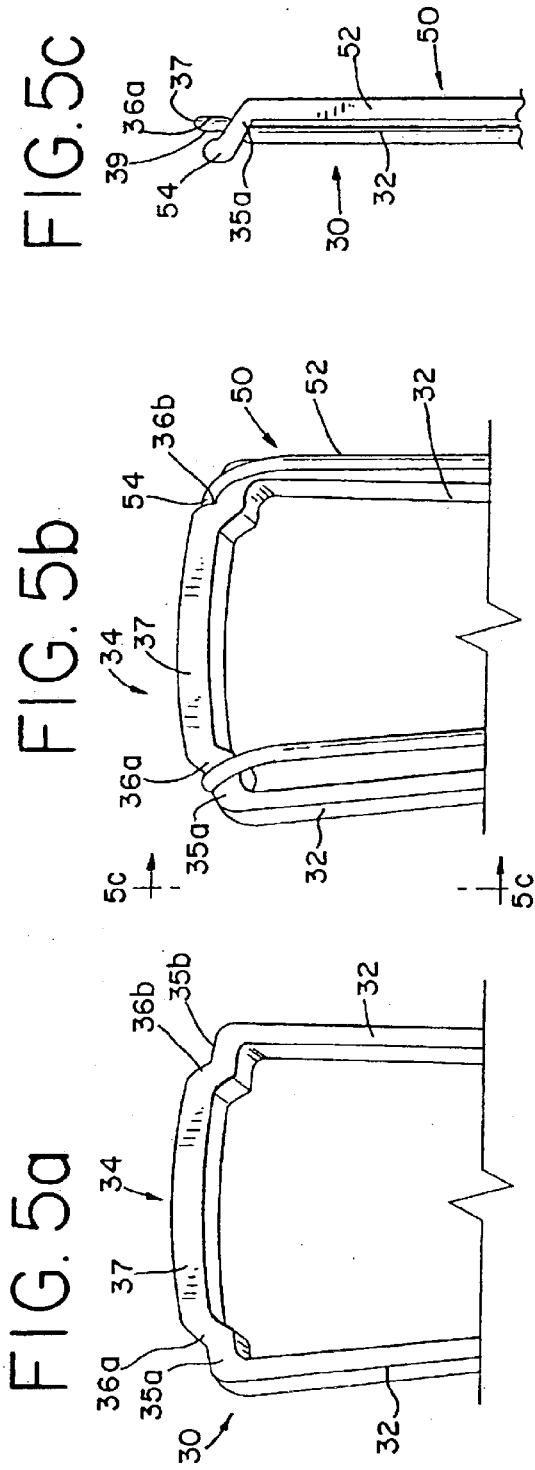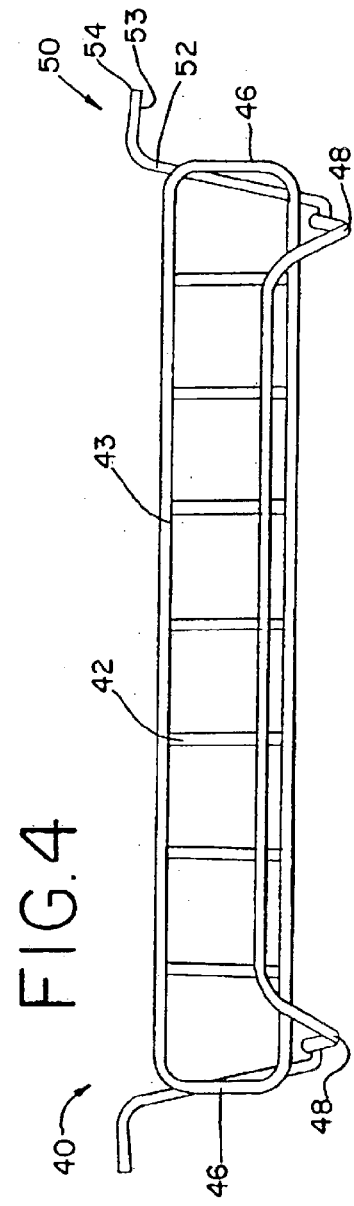

ROASTER WITH HANGING AND INTERLOCKING RACK

This application is a continuation of U.S. patent application Ser. No. 10/231,763, filed Aug. 28, 2002, now U.S. Pat. No. 6,668,708.

FIELD OF THE INVENTION

This invention relates generally to roasting pans, and more particularly to, a roasting pan with a hanging and interlocking rack.

BACKGROUND OF THE INVENTION

Roasting pans with wire racks are commonly used for roasting or baking a large food item, such as a roast or turkey, in the oven. Typically, the wire racks are removable from the roasting pan. The wire racks are designed to support the food item in the pan. Often, the wire racks include spacers or feet positioned at the bottom of the rack to balance the rack and allow it to stand on a flat surface. The spacers raise the rack to position the roast so that it is off of the bottom surface of the pan. Thus, the wire rack prevents the roasts from being submerged in the cooking juices. However, it can be undesirable for the rack or spacers to rest on the interior of the pan when the pan has a non-stick coating because the wire rack can damage the non-stick surface of the pan.

Typically, wire racks are positioned in roasting pans such that the wire rack extends the length of the roasting pan and the width of the roasting pan. Also, the wire rack may include handles. The handles are positioned such that one handle is at each end of the rack. Thus, depending on the size and placement of the wire rack in the roasting pan, the wire rack handles that extend from the wire rack are positioned opposite each other at the ends of the roasting pan or at the middle of the roasting pan. If the roasting pan also has handles, the wire rack handles can be aligned with and adjacent to the roasting pan handles.

Often when the roasting pan with the wire rack is removed from the oven, the rack and the food item thereon shift.

Accordingly, it is an object of the invention to provide a roasting pan with a wire rack that does not shift when moved or removed from the oven.

It is another object of the invention to provide a wire rack having handles that interlock with the handles of the roasting pan.

It is another object of the invention to provide a wire rack that hangs in the roasting pan and prevents the food item from sitting in the cooking juice.

It is another object of the invention to provide a suspended wire rack that raises the food item thereon from the bottom of the pan thereby providing improved heat distribution.

It is another object of the invention to provide a wire rack that does not damage the interior surface of the roasting pan.

These and other objects of the present invention, as well as the advantages thereof over existing prior art forms, which will become apparent from the description to follow, are accomplished by the improvements herein after described and claimed.

SUMMARY OF THE INVENTION

The present invention is directed to a cooking implement such as a roaster that includes a rack and a pan. The rack has opposed sides that are separated by a surface used to support food. The rack also includes a looped handle that may be formed at each end or side of the rack. The pan has opposed side walls and opposed end walls connecting the side walls. Each end wall or side wall of the pan includes an upstanding handle. The handles include at least one horizontal resting surface for supporting the looped handle of the rack. The handle also includes at least one outwardly facing vertical retaining surface for abutting the looped handle of the rack. The looped handles of the rack are received and supported by the handles of the pan. As a result, the rack is interlocked with the pan such that the rack does not shift when the pan is moved.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 2 is a top perspective view of the roasting pan of FIG. 1.

FIG. 3 is a top perspective view of the rack of FIG. 1.

FIG. 4 is a side elevational view of the rack of FIG. 3 taken substantially along line 4—4 of FIG. 3.

FIG. 5A is an isometric view of one of the handles of the roasting pan of FIG. 1.

FIG. 5B is an isometric view of one of the handles of the rack interlocked with one of the handles of the roasting pan of FIG. 1.

FIG. 5C is a side view of one of the handles of the rack interlocked with one of the handles of the roasting pan taken substantially along line 5C—5C of FIG. 5B.

DESCRIPTION OF THE PREFERRED EMBODIMENT

Figure 1:
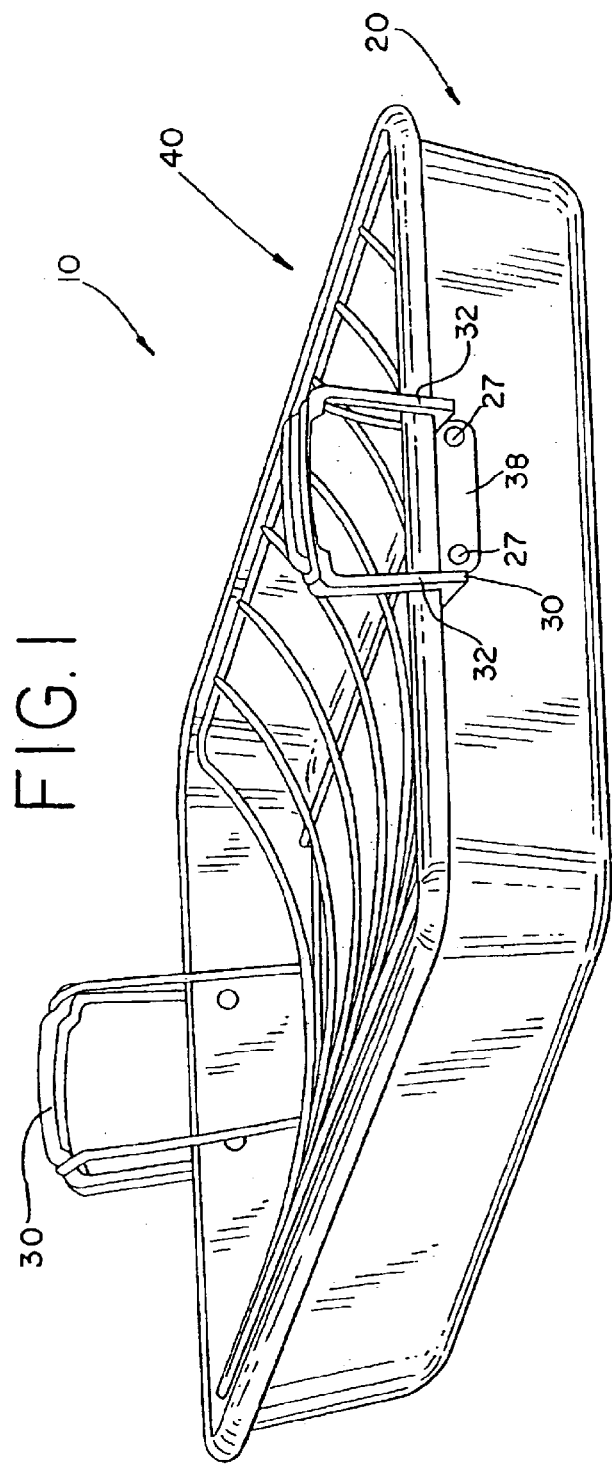
FIG. 1 is an isometric view of a roasting pan with a hanging and interlocking rack of the present invention.

The roasting pan with the removable interlocking rack of the present invention is indicated in general at 10 in FIG. 1. The roasting pan, indicated in general at 20, is preferably rectangular but could be formed from other shapes, such as a square or an ellipse. The roasting pan 20 is designed to accommodate a rack, indicated in general at 40, inside the roasting pan 20. The rack 40 can be sized so that it does not extend beyond the edges of the roasting pan 20.

Figure 1A:
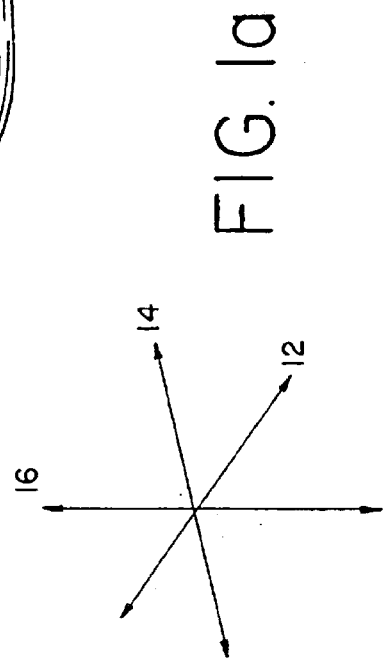
FIG. 1A illustrates a frame of reference used in describing the invention.

As defined in conjunction with the frame of reference shown in FIG. 1A, the pan 20 has a length in a first direction 12, a width in a second direction 14 that is orthogonal to first direction 12, and a height in a third direction 16 that is orthogonal to both first and second directions 12 and 14. While in the illustrated embodiment the length of pan 20 is greater than its width and both are greater than the height, these proportions may be varied without departing from the invention.

As illustrated in FIG. 2, the roasting pan 20 includes a bottom 22, opposing side walls 24 and opposing end walls 26. The roasting pan is formed from a metal, such as aluminum, steel or stainless steel. The interior surface of the roasting pan, including the bottom 22, the opposing side walls 24 and the opposing end walls 26, is preferably covered with a non-stick coating. The non-stick coating facilitates the clean up of the pan. However, a roasting pan without a non-stick coating may be used without departing from the invention. Additionally, a roasting pan having the interior surface covered with a porcelain coating may also be used.

Each of the opposing ends 26 of the roasting pan 20 includes a handle 30 attached thereto. In the illustrated embodiment each handle 30 includes a plate 38 that is disposed in a plane substantially parallel to the end wall 26 to which it is affixed. The plate 38 of each handle 30 is fastened to the outer surface of the end walls 26 by a fastener, such as a rivet 27. The handle 30 may also be welded to the outer surface of the end walls 26. The plate 38 forms the bottom of the handle 30. A vertically disposed upwardly extending leg 32 is positioned at each end of the plate 38. The vertically disposed upwardly extending legs 32 are joined at the top by horizontal member 34. The design of the handle 30 is illustrated and will be explained in detail with reference to FIG. 5A. Alternatively, each handle may be integrally formed with the pan such that the handles extend from the opposite ends of the pan. Also, the handle may be fastened, welded or integrally formed to the opposite side walls of the pan.

FIG. 3 illustrates a top perspective view of the rack 40. FIG. 4 illustrates a side view of the rack 40. As with the inside surface of the roasting pan 20, the rack 40 can be covered with a non-stick coating. Alternatively, the rack may be chrome plated or stainless steel. In the illustrated embodiment, the rack 40 features an arc-shaped convex surface 42 with lateral sides 43 situated higher than the center 45 for supporting a food item and for preventing the food item from falling off the rack when the pan and rack are moved. Other shapes for surface 42 could be used, such as U-shaped, V-shaped or a flat surface. A generally rectangular wire base 44 is attached to the bottom of the arc-support surface 42. The arc-support surface 42 and base 44 of the rack 40 are sized to fit inside of the roasting pan 20 as shown in FIG. 1. Thus, as discussed with reference to FIG. 1A, the rack also has a length in a first direction 12, a width in a second direction 14 that is orthogonal to the first direction and a height in a third direction 16 that is orthogonal to the first and second directions. In addition, as with the shape of the roasting pan, the support surface 42 and the base 44 may also be formed from other shapes, such as a square or an ellipse, as long as the shape of the rack 40 corresponds to the shape of the roasting pan 20 to enable the rack 40 to fit inside of the roasting pan 20.

The wire base 44 includes opposing sides 43 and opposing end portions 46 which are bent downwards to form feet 48 upon which the rack 40 rests when placed on a flat surface independent of the roasting pan 20. The rack 40 also includes a looped handle 50 positioned at each end portion 46 of the base 44. Alternatively, the handle may be positioned on the sides 43 of the rack 40. Each looped handle 50 extends from the base 44 to above the support surface 42. Each handle includes two upwardly extending vertical legs 52 and a terminal loop portion 51 that is disposed above the support surface 42. The terminal loop portion 51 is defined by the two upwardly extending vertical legs 52 that are bent to form a pair of outwardly extending arms 53 which are joined by a slightly curved horizontal member 54.

FIG. 5A illustrates one of the handles 30 of the roasting pan 20. The handle 30 is preferably cast metal but can also be formed from a forged or stamped metal. The handle 30 consists of a pair of spaced apart vertical legs 32 and a horizontal member 34 joining the legs 32. The horizontal member 34 includes two resting or support surfaces 35a and 35b that lead to respective substantially vertical retaining surfaces 36a and 36b formed at each end of the horizontal member 34. As illustrated, the resting surfaces 35a and 35b can be a relatively small horizontal surface or the resting surfaces can be the tangency of a radiused surface. Resting surfaces 35a and 35b are respectively formed at the top of each leg 32. Retaining surfaces 36a and 36b face in opposite directions parallel to the width direction 14 of the pan 20 and rack 40. In an illustrated embodiment, laterally outward facing retaining surfaces 36a and 36b are completely vertical, but in the preferred embodiment they slope downwardly and away from the longitudinal axis of the pan 20 and rack 40. The vertical retaining surfaces 36a and 36b are joined by cross member 37. The cross member 37 forms a longitudinally outward facing retaining surface 39, as best seen in FIG. 5C. The configuration of the resting surfaces 35a and 35b and the retaining surfaces 36a, 36b and 39 provide a locking arrangement that secures the rack handle 50 to the roasting pan handle 30 as shown in FIGS. 5B and 5C.

FIG. 5B illustrates the handle 50 of the rack handle 50 interlocked with the handle 30 of the roasting pan 20. FIG. 5C is a side view of the rack handle 50 interlocked with the handle 30 of the roasting pan 20. The rack handle 50 is oriented such that the horizontal member 54 is positioned behind (that is outward from an outward direction) the horizontal member 34 of the roasting pan handle 30. Thus, the terminal loop portion 51 protrudes laterally and exteriorly of the resting surface 35a and 35b and the retaining surfaces 36a, 36b and 39 of the pan handles 30. The arms 53 of the rack handle 50 rest on the resting surfaces 35a and 35b and abut the retaining surfaces 36a, 36b and 39 of the roasting pan handle 30 thereby interlocking the rack handle 50 to the roasting pan handle 30.

Laterally outwardly facing retaining surfaces 36a and 36b lock the rack handle 50 in the width direction relative to the pan handle 30. Similarly, the longitudinally outward facing retaining surface 39, in conjunction with its opposed retaining surface 39 on the other pan handle 30, locks the entire rack 40 in the length direction relative to the pan 20 in which it sits. Therefore, once the rack 40 is dropped into place on handles 30, there will be minimal movement of the rack 40 relative to the pan 20.

The interlocked handles allow the user to simultaneously move the pan and rack by gripping the interlocked handles. Alternatively, the resting surfaces 35a and 35b may project inwardly in a horizontal plane such that the cross member 37 is positioned over the inside surface of the pan. This configuration would accommodate a rack that has a substantially shorter length than the length of the pan.

Figure 6:
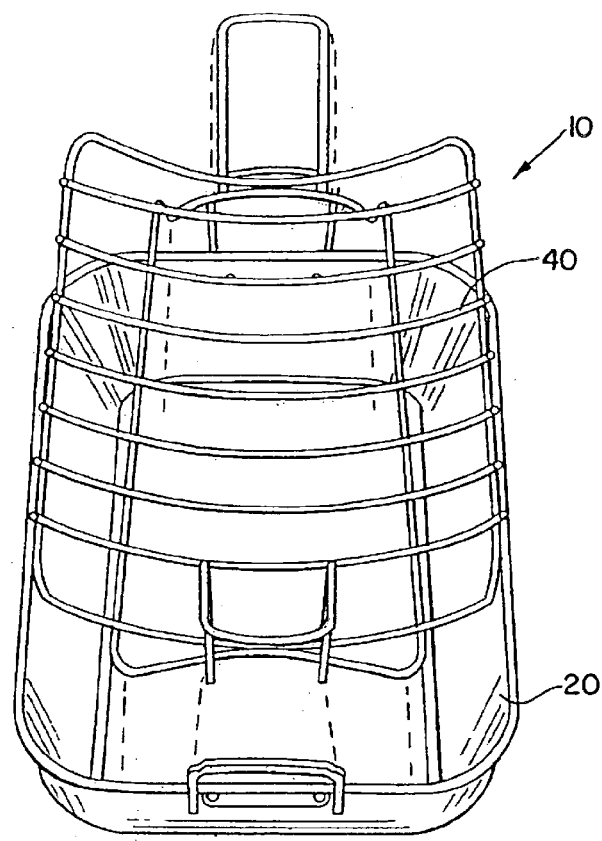
FIG. 6 is an exploded view of the rack and the roasting pan of FIG. 1.

FIG. 6 illustrates the rack 40 before it is inserted into the roasting pan 20. The rack 40 is aligned with the roasting pan 20 and then placed into the pan 20. The rack handles 50 are positioned such that the arms 53 rest on the resting surfaces 35a and 35b and abut the retaining surfaces 36a, 36b and 39 and the horizontal member 54 is behind (longitudinally exterior of) the cross member 37 of the roasting pan handle 30.

Figure 7:
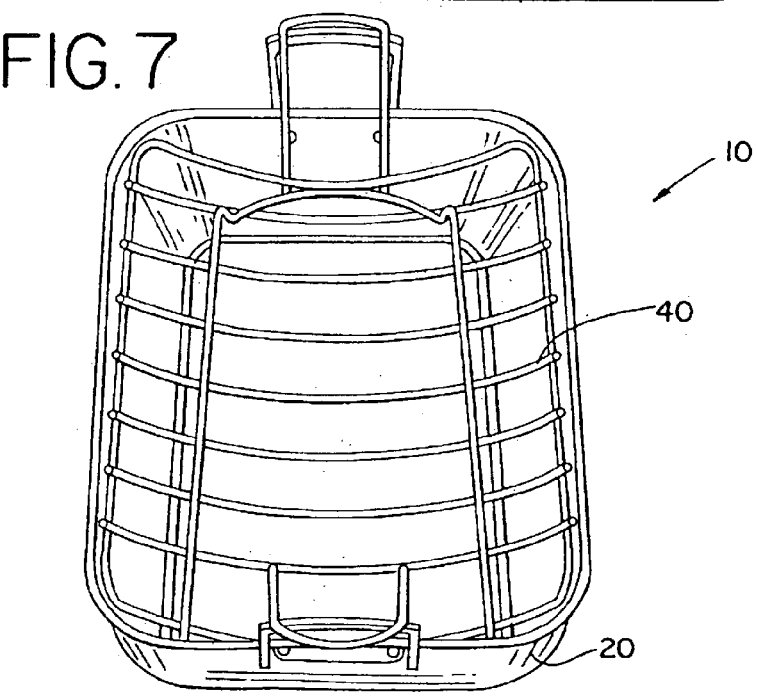
FIG. 7 is a top perspective view of the roasting pan with the hanging and interlocking rack of FIG. 1.

FIG. 7 illustrates the handles 50 of the rack 40 interlocked to the handles 30 of the roasting pan 20. The interlocked pan handle 30 and rack handle 50 secure the rack 40 to the roasting pan 20 so that the rack 40 does not slide or adjust when food is placed on the rack 40 or when the pan 20 and rack 40 are moved. The roasting pan handles 30 support the rack 40 such that the rack 40 hangs from the roasting pan handles 30 and does not touch the bottom surface of the roasting pan 20. This prevents unwanted damage to the non-stick coating of the bottom surface, such as scratching the non-stick surface off of the bottom surface. Additionally, the suspended rack 40 allows air to circulate underneath the rack 40 and the food item thereon providing an improved cooking environment.

Figure 8:
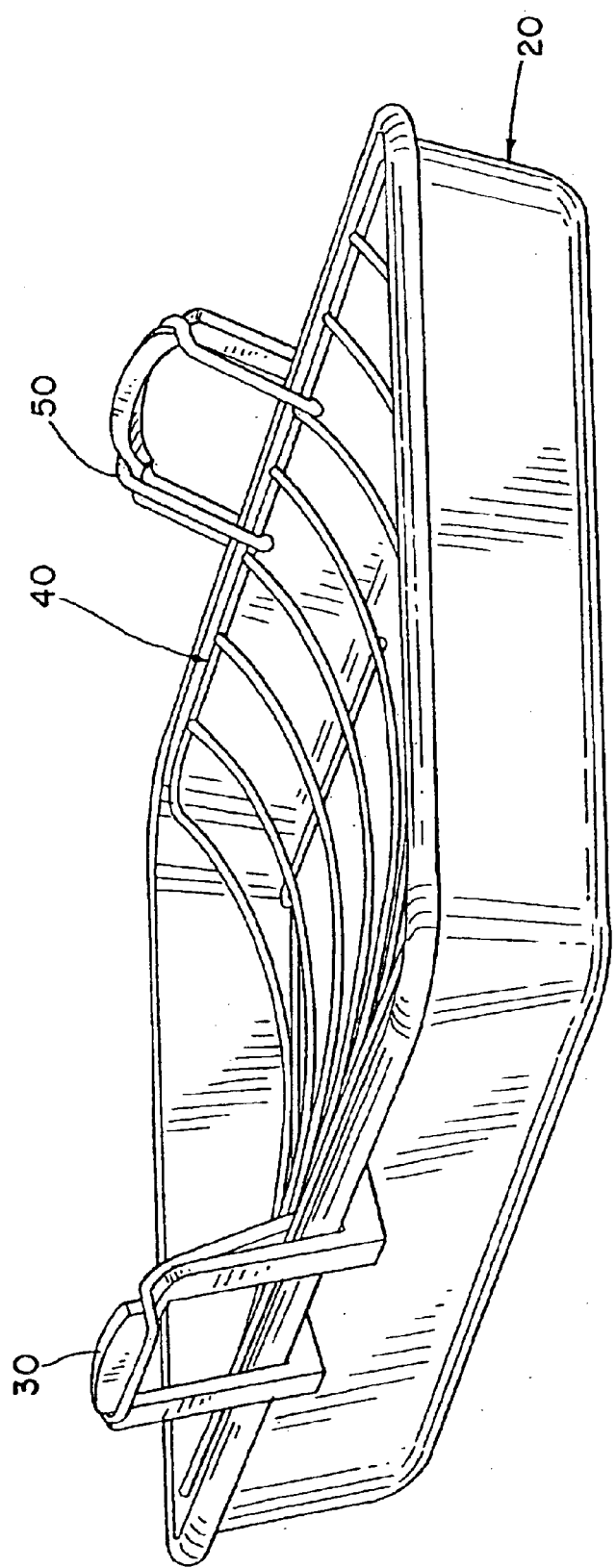
FIG. 8 is an alternative isometric view of the roasting pan with the hanging and interlocking rack of the present invention.

As shown in FIG. 8, the handles of the rack and the handles of the pan may be positioned on opposite sides of the rack and pan, respectively, to form the hanging and interlocking rack of the present invention.

Figure 9:
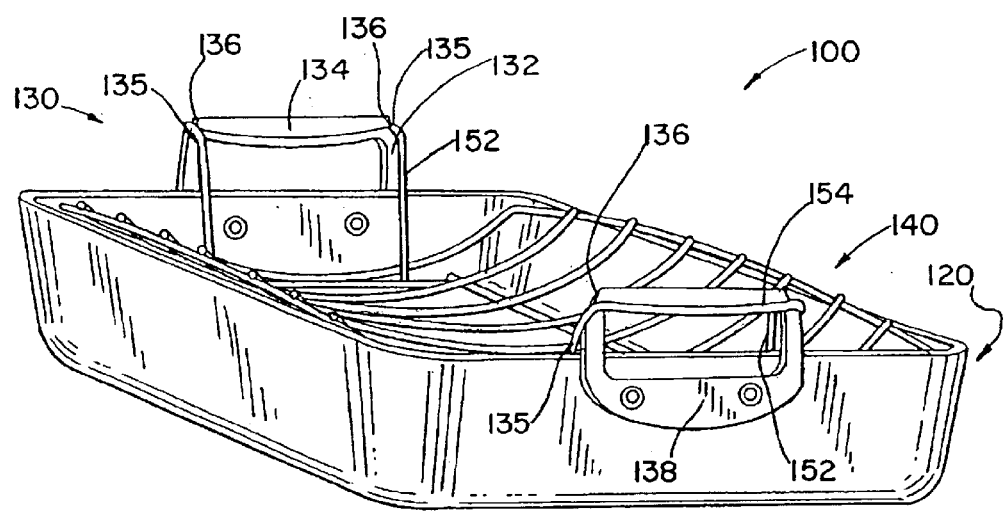
FIG. 9 is an isometric view of an alternative roasting pan with a hanging and interlocking rack of the present invention
Figure 10:
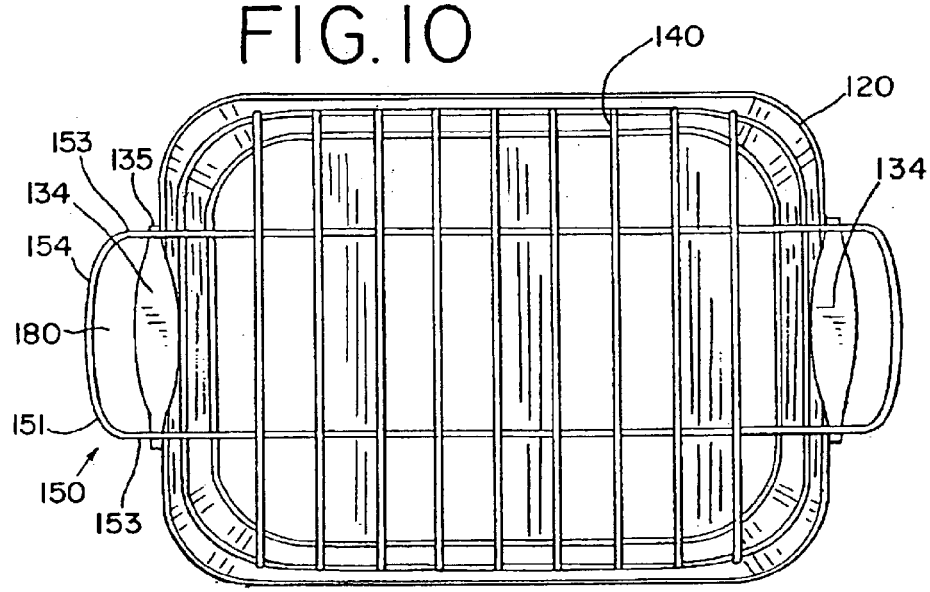
FIG. 10 is a top perspective view of the alternative roasting pan with the hanging and interlocking rack of FIG. 9.

FIG. 9 and FIG. 10 illustrate an alternative and improved embodiment for the roaster with the hanging and interlocking rack of the present invention. In this embodiment, the pan handle 130 includes a plate 138 that is affixed to the pan 120. A vertically disposed upwardly extending leg 132 of handle 130, is positioned at each end of the plate 138. The vertical legs 132 are joined by a horizontal member 134. The horizontal member 134 includes a concavely curved resting surface 135 formed at the top of each vertical leg 132. The curved resting surfaces 135 lead to vertical outwardly facing retaining surfaces 136. The horizontal member 134 is relatively flat with a varying width that increases from its minimum at the vertical retaining surfaces to a maximum at the center of the horizontal member 134, as is best seen in FIG. 10.

The rack handle 150 includes two legs 152 that extend upwardly from the base of the rack 140. The legs 152 are joined by a terminal loop 151. The terminal loop 151 includes two outwardly extending arms 153 that are joined by a slightly curved horizontal cross member 154.

When the rack 140 is positioned in the pan 120, the arms 153 of the rack handle rest on the curved resting surfaces 135 and are adjacent to the vertical retaining surfaces 136. The tangency of the radiused surface supports the rack. The terminal loop extends outwardly from the pan leaving an opening 180 between the cross member 134 of the pan handle and the cross member 154 of the rack handle so that the rack handle 150 may be more easily grasped.

While preferred embodiments of this invention have been shown and described, it will be apparent to those skilled in the art that changes and modifications may be made therein without departing from the spirit of the invention, the scope of which is defined by the appended claims.

What is claimed is:

1. A cooking implement, comprising:
  a rack having at least one food support surface, opposing ends separated by a first length and opposing sides separated by a first width and opposing terminal loop portions; and
  a pan having opposing end walls spaced apart by a second length longer than the first length and opposing side walls spaced apart by a second width wider than the first width, wherein the pan has opposing upstanding handles, each having at least one resting surface for supporting a respective terminal loop portion of the rack, each handle further having at least one substantially vertical surface for abutting a respective terminal loop portion of the rack such that the terminal loop portions of the rack may be received by the handles of the pan.

2. The cooking implement of claim 1, wherein the terminal loop portions of the rack are formed at each end of the rack and the upstanding handles of the pan are formed at the end walls of the pan.

3. The cooking implement of claim 1, wherein the terminal loop portions of the rack are formed at each side of the rack and the upstanding handles of the pan are formed at the side walls of the pan.

4. The cooking implement of claim 1, wherein the at least one substantially vertical surface is outwardly facing.

5. The cooking implement of claim 1, wherein the terminal loop portions of the rack are disposed above the food support surface of the rack.

6. The cooking implement of claim 1, wherein said rack also has opposing looped handles including the opposing terminal loop portions.

7. The cooking implement of claim 1, wherein each pan handle has two substantially vertical surfaces.

8. The cooking implement of claim 1, wherein each pan handle has two resting surfaces.

9. The cooking implement of claim 1, wherein the terminal loop portions of the rack are formed to lay on top of and protrude exteriorly of the resting and substantially vertical surfaces, respectively, of the pan handles.

10. The cooking implement of claim 1, wherein the pan handle is cast, forged or stamped metal.

11. The cooking implement of claim 1, wherein the rack is metal.

12. The cooking implement of claim 1, wherein the food support surface of the rack is arc-shaped.

13. The cooking implement of claim 1, wherein the rack is covered with a non-stick coating.

14. The cooking implement of claim 1, wherein the rack is chrome plated.

15. The cooking implement of claim 1, wherein the inside surface of the pan is covered with a non-stick coating.

16. The cooking implement of claim 1, wherein the rack is suspended in the pan such that the food support surface does not contact the pan.

17. The cooking implement of claim 1, wherein the rack has a convex shape for supporting a food item.

18. The cooking implement of claim 1, wherein the resting and substantially vertical surfaces are located near the top of the upstanding handle.

19. The cooking implement of claim 1, wherein the substantially vertical surface of the upstanding handle is a retaining surface.

20. The cooking implement of claim 1, where the substantially vertical surface is positioned adjacent to the resting surface on the upstanding handle.

* * * * *